(12) United States Patent
Kuhlmann et al.

(10) Patent No.: US 10,611,285 B2
(45) Date of Patent: Apr. 7, 2020

(54) SEAT ADJUSTER WITH ADDITIONAL LOCKING MEANS

(71) Applicant: Rollax GmbH & Co. KG, Bad Salzuflen (DE)

(72) Inventors: Michael Kuhlmann, Bielefeld (DE); Jörg Franke, Minden (DE)

(73) Assignee: Rollax GmbH & Co. KG, Bad Salzuflen (DE)

( * ) Notice: Subject to any disclaimer, the term of this patent is extended or adjusted under 35 U.S.C. 154(b) by 300 days.

(21) Appl. No.: 15/745,247

(22) PCT Filed: Jul. 22, 2016

(86) PCT No.: PCT/EP2016/067490
§ 371 (c)(1),
(2) Date: Jan. 16, 2018

(87) PCT Pub. No.: WO2017/016996
PCT Pub. Date: Feb. 2, 2017

(65) Prior Publication Data
US 2019/0001847 A1  Jan. 3, 2019

(30) Foreign Application Priority Data

Jul. 28, 2015 (DE) .................. 20 2015 103 949 U (51) Int. Cl.
*B60N 2/90* (2018.01)
*B60N 2/16* (2006.01)
(Continued)

(52) U.S. Cl.
CPC ............ *B60N 2/938* (2018.02); *B60N 2/167* (2013.01); *B60N 2/168* (2013.01); *B60N 2/1685* (2013.01);
(Continued)

(58) Field of Classification Search
CPC ...... B60N 2/167; B60N 2/168; B60N 2/1685; B60N 2/938; B60N 2002/952; F16D 41/066
See application file for complete search history.

(56) References Cited

U.S. PATENT DOCUMENTS 6,481,557 B2 * 11/2002 Denis ..................... B60N 2/167
192/15
2013/0119212 A1 * 5/2013 Benjamin ............. F16D 41/066
248/188.2
(Continued)

FOREIGN PATENT DOCUMENTS

DE        3815602 A1    11/1989
DE       10355821 A1     6/2005
(Continued)

*Primary Examiner* — Richard M Lorence
(74) *Attorney, Agent, or Firm* — Richard M. Goldberg (57) ABSTRACT

A seat adjuster having a fixed part (12), a drive element (26), an output element (22, 24), a clamping body coupling arrangement (16) by means of which a back and forth movement of the drive element (22, 24) out of a neutral position and back into the neutral position is converted into a continued movement of the output element (22, 24) in a uniform direction of rotation, and a releasable locking device for locking the output element (22) in a form-fitting manner on the fixed part (12), characterized in that the locking device is formed by a locking ring (74) which is axially displaceable between a locking position, in which it is non-rotatably coupled to the output element (22), and a release position, and cam surfaces (82, 84) are formed on the locking ring (74) and the drive element (26), which cam surfaces are complementary to one another and translate a rotation of the drive element (26) away from the neutral position into an axial movement of the locking ring (74) into the released position.

7 Claims, 5 Drawing Sheets

(51) Int. Cl.
*F16D 41/06* (2006.01)
*B60N 2/225* (2006.01)
*B60N 2/22* (2006.01)
*F16D 41/066* (2006.01)

(52) U.S. Cl.
CPC ........... *B60N 2/224* (2013.01); *B60N 2/2257* (2013.01); *F16D 41/06* (2013.01); *F16D 41/066* (2013.01); *F16D 2041/0608* (2013.01)

(56) References Cited

U.S. PATENT DOCUMENTS

| | | | | |
|---|---|---|---|---|
| 2015/0291068 A1* | 10/2015 | Stemmer | ............. | B60N 2/1685 297/463.1 |
| 2016/0193945 A1* | 7/2016 | Stemmer | ................ | B60N 2/919 74/530 |
| 2017/0291513 A1* | 10/2017 | Stemmer | ................ | B60N 2/168 |

FOREIGN PATENT DOCUMENTS

| | | |
|---|---|---|
| DE | 202010007993 U1 | 12/2011 |
| EP | 0743221 B1 | 6/2001 |
| EP | 0979179 B2 | 11/2006 |
| WO | 2012013234 A1 | 2/2012 |

\* cited by examiner

SEAT ADJUSTER WITH ADDITIONAL LOCKING MEANS

BACKGROUND OF THE INVENTION

The invention relates to a seat adjuster having a fixed part, a drive element, an output element, a clamping body coupling arrangement by means of which a back and forth movement of the drive element out of a neutral position and back into the neutral position is converted into a continued movement of the output element in a uniform direction of rotation, and a releasable locking device for locking the output element in a form-fitting manner on the fixed part.

A seat adjuster of this type is known from EP 0 979 179 B2.

Such seat adjusters are used in particular in automotive vehicles for transmitting an adjustment moment from an actuating member onto a gear which drives the part of the vehicle seat to be adjusted, for example for the purpose of seat height adjustment.

When a torque is exerted onto the drive element by means of the actuation member, the clamping bodies are released from their clamping position, so that the drive torque can be transmitted onto the output element. As soon as the drive element is force-free again, the clamping bodies are elastically urged back into the clamping position, so that the drive element is arrested at the fixed part in the position that has then been reached. A one-way clutch assures that, when the drive element returns into the neutral position, only the drive element will be moved, whereas the output element remains in the adjusted position.

A similar seat adjuster is also known from DE 20 2010 007 993 U1, EP 0 743 221 B1 and WO 2012/013234 A1 which describe seat adjusters in which a second clamping body coupling is provided in place of the one-way clutch.

The clamping force generated by the clamping bodies allows the adjustable part of the vehicle seat to be held safely in the adjusted position even when the vehicle seat is subject to very high external forces, e.g. in a collision of the vehicle. However, if the drive element is permanently subject to a torque, e.g. due to the force of weight of a person sitting on the vehicle seat or, if the seat is not occupied, due to a force of a spring that is provided for partly compensating the weight force of the person, a gradual roll-off of the clamping bodies along the clamping contours may occur as a result of vibrations, which results in a gradual undesired adjustment of the seat. For this reason, the document EP 0 979 179 B2 mentioned in the opening part of the description describes a locking device which can achieve an additional form-fitting lock of the drive element in the adjusted position, so that a gradual roll-off of the clamping bodies is prevented. As soon as the actuating member is operated, however, in order to intentionally adjust the vehicle seat, the additional locking action is released automatically. In the known seat adjuster, the locking device is formed by a latch that is arranged outside of the periphery of the clamping body coupling.

SUMMARY OF THE INVENTION

It is an object of the invention to provide a seat adjuster having such an additional locking device but having a simplified and more compact design.

In order to achieve this object, according to the invention, the locking device is formed by a locking ring which is axially displaceable between a locking position, in which it is non-rotatably coupled to the output element, and a release position, and cam surfaces are formed on the locking ring and the drive element, which cam surfaces are complementary to one another and translate a rotation of the drive element away from the neutral position into an axial movement of the locking ring into the released position.

Useful further details of the invention are indicated in the dependent claims.

BRIEF DESCRIPTION OF THE DRAWINGS

An embodiment example will now be described in conjunction with the drawings, wherein.

DETAILED DESCRIPTION

Figure 1:
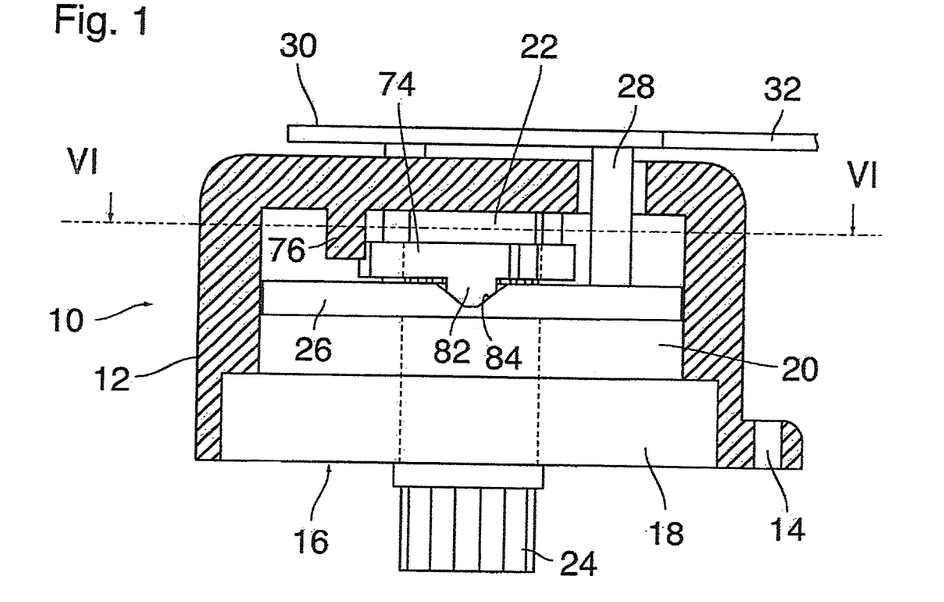
FIG. 1 is an axial sectional view of a housing of a seat adjuster according to the invention.

FIG. 1 shows a seat adjuster 10 having a pot-shaped housing 12 which is adapted to be mounted on a carrier (not shown), e.g. a frame of a vehicle seat, by means of mounting eyelets 14 and accommodates a coupling arrangement 16 having a first clamping body clutch 18 and a second clamping body clutch 20.

A shaft 22 passes coaxially through the housing 12 and forms a pinion 24 outside of the housing. The shaft 22 and the pinion 24, together, constitute an output element of the seat adjuster.

On the side of the coupling arrangement 16 opposite to the pinion 24, a drive element 26 is rotatably received in the housing 12. The drive element 26 is connected, via pillars 28, to an actuating member 30 having a projecting lever 32. The pillars 28 pass through arcuate slots in the ceiling of the housing 12, so that the actuating member and the drive element 26 are rotatable relative to the housing 12.

The design of the coupling arrangement 16 will now be described by reference to FIGS. 2 to 7.

Figure 2:
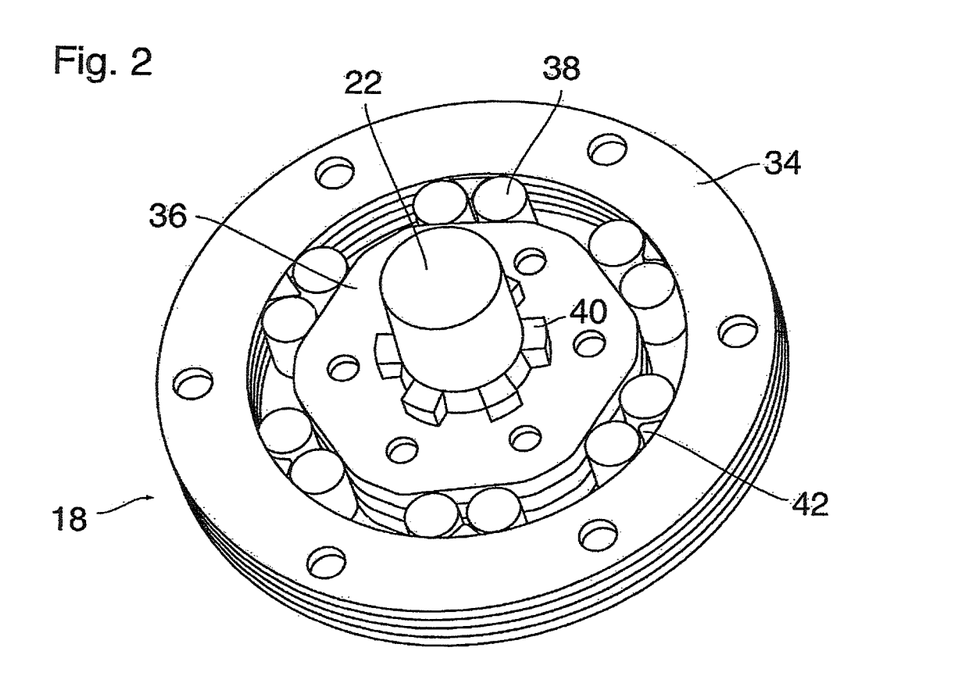
FIG. 2 is a perspective view of a first clamping body clutch of the seat adjuster.

In FIG. 2, the first clamping body clutch 18 has been shown in greater detail in a perspective view. This clamping body clutch has an outer ring 34, an inner ring 36 and a plurality of clamping bodies 38 which are disposed in pairs between the inner ring and the outer ring. The internal surface of the outer ring 34 is shaped as a circular cylinder and forms a race for the clamping bodies. Another race for the clamping bodies is formed by the outer peripheral surface of the inner ring 36. This race, however, is not circular, but forms a clamping contour with elevations which point radially outwards and reduce the free space of the annular gap between the inner ring and the outer ring to a value that is smaller than the diameter of the clamping bodies.

The clamping bodies 38 form six pairs in total, and an elastic spacer body 42 is arranged between the clamping bodies of each pair.

The inner ring 36 is keyed non-rotatably on keys 40 of the shaft 22. A gear, which has not been shown, connects the shaft 22 to a height adjusting mechanism, so that a rotation of the shaft 22 will effect a height adjustment of the seat. When the seat is subject to an external force, e.g. by the body of a person occupying the seat, the shaft 22 is subject to a torque which has the tendency to rotate this shaft together with the inner ring 36. Then, however, regardless of the direction of rotation, six of the total of twelve clamping bodies 38 enter into the narrowing parts of the gap between the inner ring and the outer ring, so that the inner ring 36 is locked at the outer ring 34 by clamp action. In this way, the shaft 22 is prevented from rotating, and, consequently, the seat is held in the position to which it has been adjusted.

The clamping body arrangement 18 further comprises a release element 44 (FIG. 4) which is mounted rotatably on the shaft 22 but is in engagement with the keys 40 with little play, so that it can be rotated relative to the inner ring 36 over a small angle. This release element has claws 46 which engage in the interspaces between the different pairs of clamping bodies 38.

Figure 4:
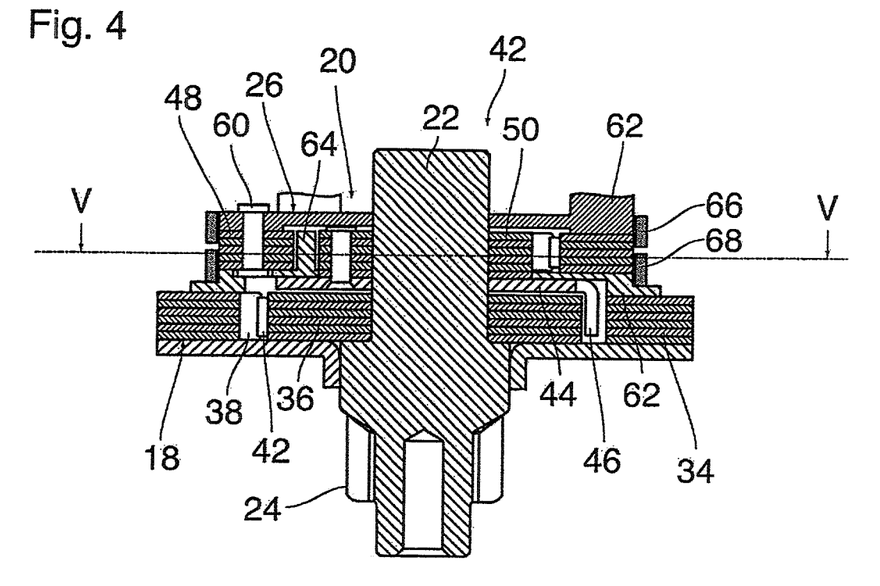
FIG. 4 is an axial sectional view of a coupling arrangement formed by the first and second clamping body clutches.

When, now, the height of the seat is to be adjusted intentionally, a torque is exerted onto the release element by means of a drive mechanism that will be described later. The minor rotation of the release element relative to the inner ring 36 has the consequence that the claws press respectively onto one of the two clamping bodies 38 of each pair and compress the spacer bodies 42. This prevents the clamping body that is engaged by the claw from entering deeper into the converging part of the gap between the inner ring and the outer ring and to exert a clamp action. When the rotation of the release element continues, the shaft 22 is entrained by the inner ring 36. Since, now, the claws prevent the silent ratchet from being locked, the release element, the inner ring 36 and the shaft 22 are rotated in the desired direction, so that the height of the seat is adjusted. During this movement, the clamping bodies 38 slide along the race formed by the stationary outer ring 34. If no torque acts upon the release element anymore, the seat is locked in the position to which it has then been adjusted.

It is a special feature of the example described here that the inner ring 36 is not formed by a massive metal body but by a stack of flat, disk-shaped lamella of steel sheet. Thus, the clamping contour is formed by the edges of the lamella which are flush with each other. Correspondingly, in the example shown, the outer ring 34 is also formed by a stack of lamella. This design allows the manufacture of the inner ring and the outer ring to be simplified significantly. For example, the lamella of the inner ring and the outer ring may simply be punched with the desired contour from a steel sheet of suitable thickness. The punched lamella are then stacked one upon the other and hardened, so that stiff races for the clamping bodies 38 are formed.

In order to prevent the lamella of the inner ring 36 to be displaced or rotated relative to one another, nipples may be pressed out of the surface of each lamella. On the opposite side of each lamella, this creates a depression complementary to the nipple. When the lamella are stacked one upon the other, the respective nipples engage in the depressions of the adjacent lamella, so that a form-fitting lock of the lamella is achieved. Correspondingly, a form fitting lock of the lamella of the outer ring 34 is achieved by nipples and corresponding depressions.

Figure 3:
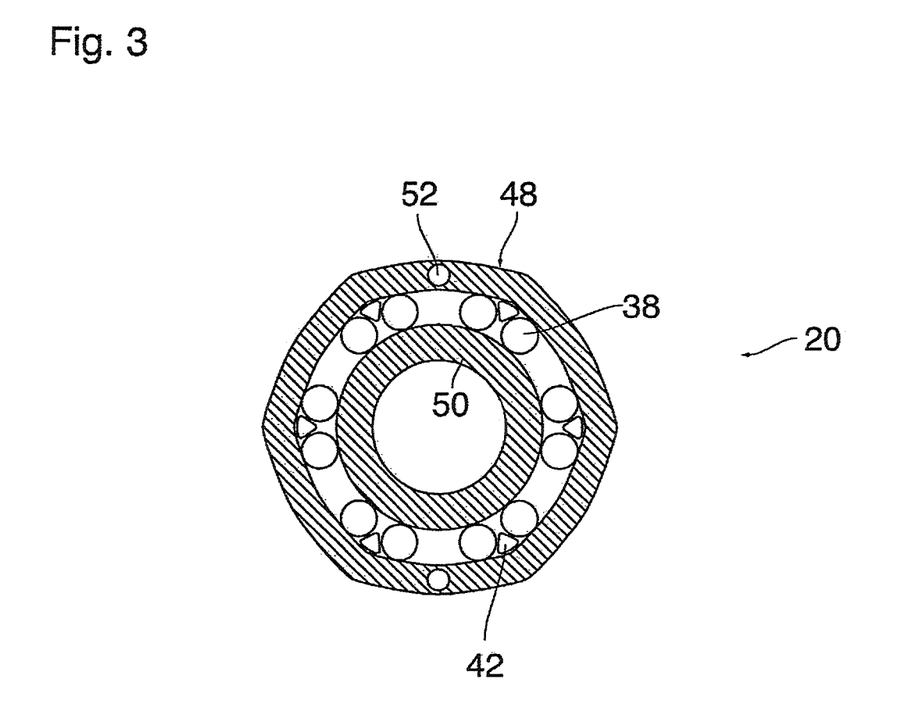
FIG. 3 is a horizontal sectional view of a second clamping body clutch of the seat adjuster.

FIG. 3 is a sectional view of a second clamping body coupling 20 having an outer ring 48 and an inner ring 50. In this example, the inner race of the outer ring 48 forms a non-circular clamping contour, whereas the inner ring 50 forms a circular race. The outer ring 48 and the inner ring 50 are again composed of lamella, and a respective one of these lamella have been shown in section in FIG. 3. In this example, the form-fitting lock of the lamella of the outer ring 50 is achieved by means of pins 52 inserted into aligned bores of the lamella.

FIG. 4 shows the entire coupling arrangement having the two clamping body clutches 18, 20. The outer ring 34 of the first clamping body clutch 18 is fixed in the housing 12 which forms a fixed part of the seat adjuster. The lamella of the inner ring 36 are non-rotatably keyed onto the shaft 22.

The release element 44 of the first clamping body clutch 18 has the shape of a flat disk which is also keyed on the shaft 22 but has a certain play in rotatory direction relative to this shaft. The outer peripheral edge of the release element 44 forms the claws 46 which engage into the annular gap between the inner ring and the outer ring of the clamping body clutch 18.

The inner ring 50 of the second clamping body clutch 20 rests on the release element 44. Its lamella are held together with the release element 44 by means of rivets (no reference sign). The lamella of the inner ring 50 are in engagement with the keys 40 of the shaft 22 via grooves, so that they are rotatable relative to the shaft only within a limited play, just as the release element 44.

The drive element 26 rests on the outer ring 48 of the second clamping body clutch 20. The lamella of this outer ring and the drive element 26 are held together by rivets 60.

A release element 62 of the second clamping body clutch 20 is inserted between the lamella of the outer ring 34 of the first clamping body clutch 18 and the release element 44 of the first clamping body clutch 18. The release element 62 has, at its inner periphery, upwardly projecting claws 64 which engage in the annular gap between the inner ring 50 and the outer ring 48 of the second clamping body clutch 20. In order to achieve a particularly compact design, the lower heads of the rivets 60 are received in arcuate elongated slots of the release element 62.

Figure 5:
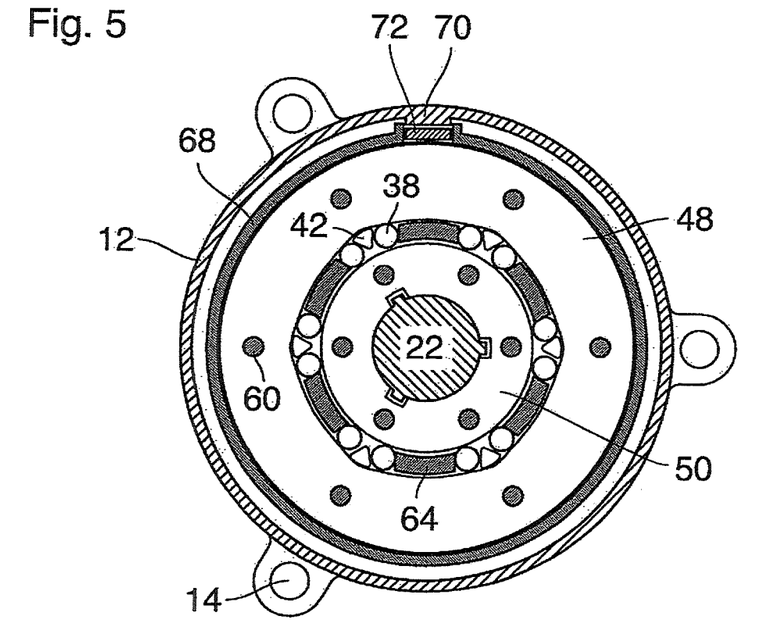
FIG. 5 is a sectional view taken along the line V-V in FIG. 4.

FIG. 5 illustrates the arrangement of the clamping bodies 38 and the spacer bodies 42 of the second clamping body clutch 20 between the lamella of the inner ring 50 and the lamella of the outer ring 48, as well as the claws 64 of the release element 62.

The outer ring 48 is surrounded by two annular lock springs 66, 68 (the lock spring 66 is visible only in FIG. 4). As is shown in FIG. 5, the ends of the lock spring 68 are immobilized on the one hand at a stop 70 on the inner peripheral surface of the housing 12 and on the other hand at a stop 72 which projects from the release element 62. Similarly, the ends of the lock spring 66 are immobilized at a stop 70 fixed at the housing and at a stop (not shown) of the drive element 26.

As is shown in FIG. 1, a locking ring 74 is provided in a space between the drive element 26 and the ceiling of the housing 12 and is guided to be movable in axial direction but not rotatable in guides 76 which project from the ceiling of the housing 12.

Figure 6:
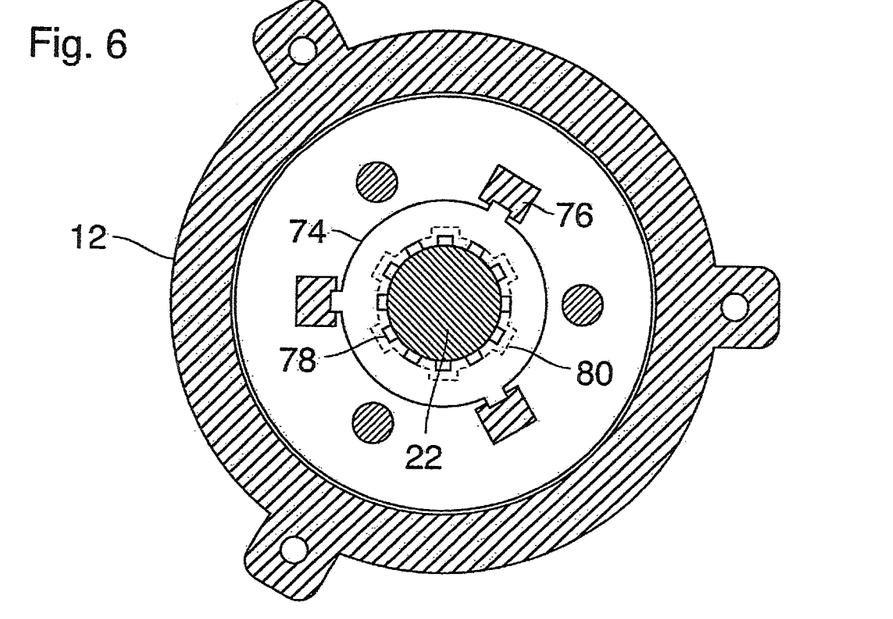
FIG. 6 is a sectional view taken along the line VI-VI in FIG. 1.

As is shown in FIG. 6, the shaft 22 has a portion which penetrates the locking ring 74 and has axial keys 78 on its outer periphery, the keys being in engagement with corresponding grooves in the internal surface of the locking ring 74, so that, via the locking ring 74 and the guides 76, the shaft 22 is held non-rotatably in the housing 12. As has further been shown in phantom lines in FIG. 6, the shaft 22 is also provided with keys 80 in a portion that penetrates the drive element 26, and these keys are in engagement with corresponding grooves of the drive element 26 with little play in circumferential direction.

At the top end in FIG. 1, above the locking ring 74, the shaft 22 has a cylindrical outer peripheral surface with which it is journaled in a bore in the ceiling of the housing 12.

On the side facing the drive element 26, the locking ring 74 has two diametrically opposite cams 82 which are chamfered on both sides and engage in complementary V-notches 84 of the drive element 26. A spring (not shown) biases the locking ring 74 downwards and thereby holds the complementary cam surfaces of the cams 82 and the notches 84 in engagement. Thus, in the condition shown in FIG. 1, the output element (shaft 22 and pinion 24) is fixed non-rotatably at the fixed part (housing 12).

The operation of the seat adjuster will now be described.

The lock spring 66 holds the drive element 26 and the lever 32 attached thereto in a neutral position. When the actuating member 30 having the lever 32 is rotated in any direction about the axis of the shaft 22 out of the neutral position shown in FIG. 1, the play of the keys 80 in the corresponding grooves as well as the play of the release element 44 allows a certain rotation of the drive element 26 relative to the shaft 22 and the locking ring 74. Then, the cam surfaces of the cams 82 and the notches 84 have the effect that the locking ring 74 is lifted, against the force of the spring, into the position shown in FIG. 7 in which the keys 78 are no longer in engagement with the corresponding grooves of the locking ring 74. This cancels the form-fitting lock of the shaft 22 at the housing 12.

The drive element 26, when rotated about the shaft 22, also entrains the outer ring 48 of the clamping body clutch 20. The clamping bodies 38 lock, so that the inner ring 50 is also driven for rotation. The release element 44 of the first clamping body clutch 18 also participates in this rotation and the claws 46 of this release element effect the release of the clamping body clutch 18 on the bottom side in FIG. 7.

Figure 7:
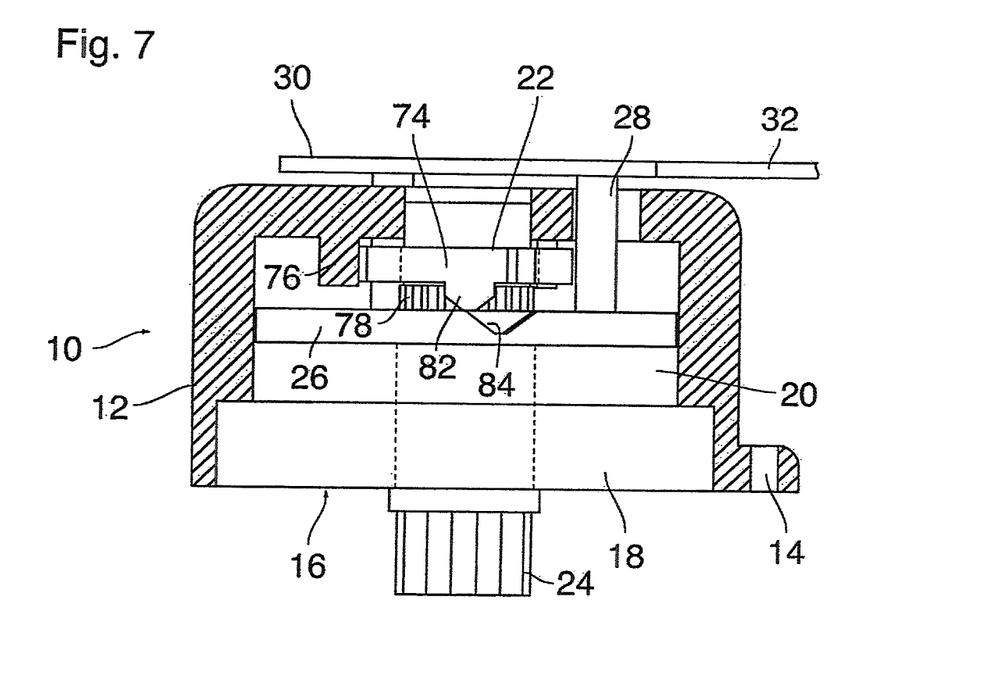
FIG. 7 is an illustration analogous to FIG. 1, but for the released condition of the seat adjuster.

Consequently, as soon as the inner ring 50 has experienced a minor rotation, the shaft 22 is also entrained in rotary direction.

When the inner ring and the outer ring of the second clamping body clutch 20 are rotated, the release element 62 is also driven for rotation against the return force of the lock spring 68. The torque is transmitted from the outer ring 48 via the clamping bodies 38 and the spacer bodies 42 onto the claws 64 of the release element 62.

If, now, the lever 32 is relinquished, the lock spring 68 presses on the stop 72 and returns the release element 62 towards the neutral position. This causes the release element 62 to release the second clamping body clutch 20. Consequently, the inner ring 50 remains in the position it has reached, and the outer ring 48, the drive element 26 and the actuating member 30 return into the neutral position alone. The return movement of the drive element 26 is assisted by the lock spring 66. Although the drive element 26 and the outer ring 48 are rotatable relative to the release element 62 via a small angle, the lever 62 is stably held in the neutral position.

Meanwhile, the shaft 22 is locked safely at the outer ring 34 of the first clamping body clutch and, consequently at the housing 12. When the lever 32 is pivoted once again in the same direction out of the neutral position, the shaft 22 can be rotated further. Thus, the seat adjuster permits, by repeated "pumping" with the lever 32, to adjust the vehicle seat in any desired direction and then to lock it in the reached position.

When the lever 32 is not rotated again, the locking ring 74 returns into the position shown in FIG. 1, and the shaft 22 is thereby form-fittingly locked again at the housing 12. If the keys 78 are not exactly flush with the corresponding grooves of the locking ring, the locking ring 74 will snap-in in the locked position only when the roll-off of the clamping bodies 38 at their races has resulted in a corresponding rotation of the shaft 22 relative to the housing 12.

Figure 8:
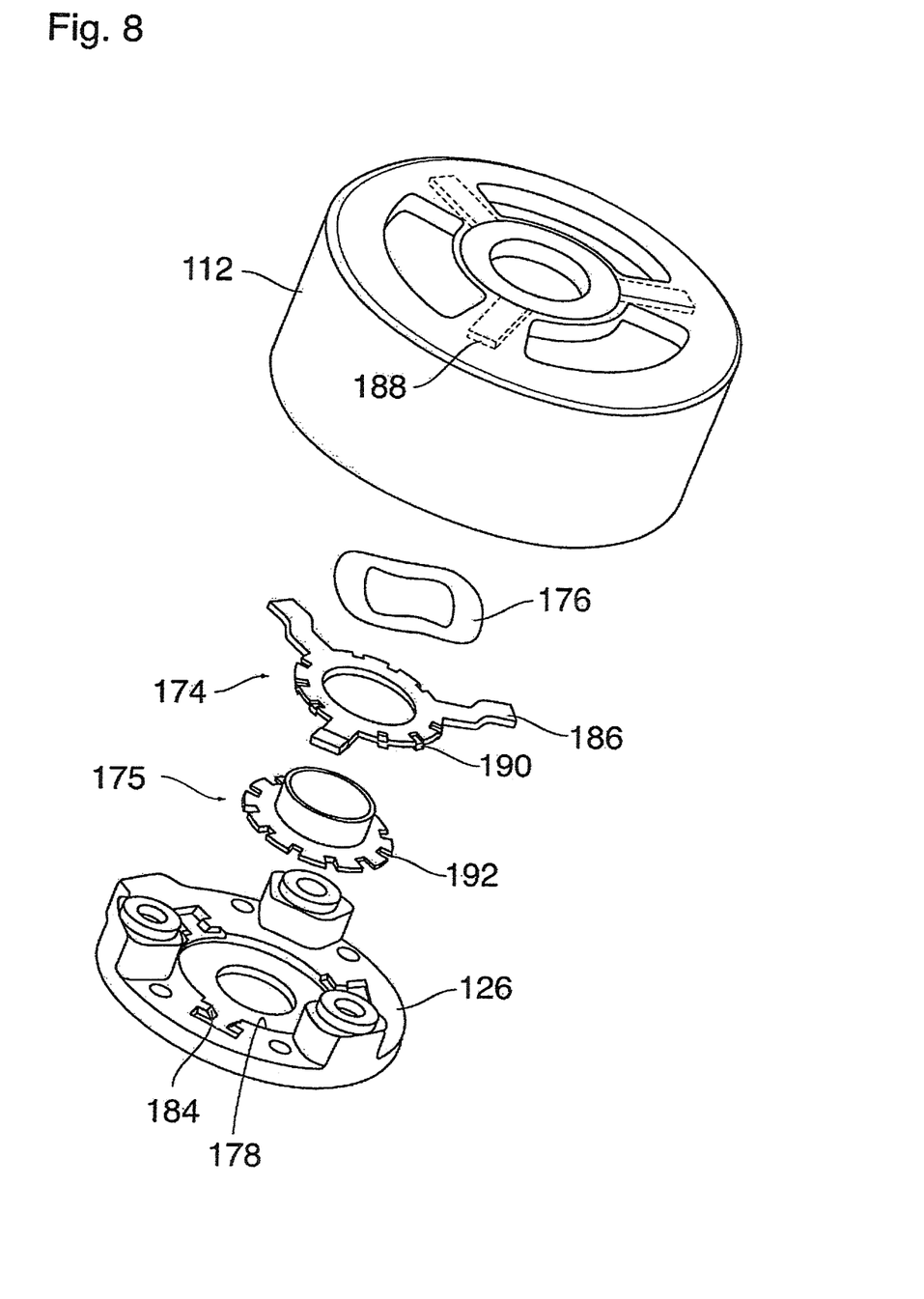
FIG. 8 is a perspective exploded view of parts of a seat adjuster according to a modified embodiment.

FIG. 8 shows a seat adjuster according to a modified embodiment. Only those parts have been shown here which differ in their construction from the corresponding parts in the embodiment example according to FIGS. 1 to 7.

This seat adjuster has a housing 112 which corresponds to the housing 12 described above, as regards its function. The drive element 126 is functionally equivalent to the drive element 26. In the embodiment according to FIG. 8, the function of the locking ring 74 is fulfilled by a locking ring 174 which cooperates with a press ring 175. A corrugated dish spring 176 is supported at the top wall of the housing 112 and presses the locking ring 174 elastically against the press ring 175 which is thereby held in a shallow annular recess 178 of the drive element 126. The recess 178 is surrounded by three pockets which are arranged at equal angular spacings and each form a V-notch 184. The locking ring 174 has radially projecting wings 186 each of which has, on its bottom side and not visible in the drawing, a cam that engages in one of the notches 184. The radially outward ends of the wings 186 are received in corresponding pockets 188 formed internally in the top wall of the housing 112. In this way, the locking ring 174 is secured against rotation in the housing 112.

The outer periphery of the locking ring is formed with a serration 190 which engages in a corresponding serration 192 of the press ring 175.

The press ring 175 is press-fitted on the shaft 22 without play. Since the inner ring 50 of the second clamping body clutch is held on the shaft 22 with play in rotary direction, the drive element 126 can slightly be rotated by means of the actuating member 30. Since, however, the locking ring 174 is held in position by the housing 112, the notches 184 cause the locking ring 174 to be lifted, with the consequence that the serration 190 is freed from the serration 192 of the press ring 175. This allows the pinion 24 and, consequently, the press ring 175 to be rotated by means of the clamping body clutches 18 and 20.

When the actuating member is relinquished, the drive element 126 returns into the neutral position under the action of the lock springs, whereas the corrugated dish spring 176 presses the locking ring 174 against the press ring 175. Then, the serrations 190 and 192 will in most cases be angularly offset from one another, so that they cannot yet come into engagement. Only when a certain roll-off of the clamping bodies and a corresponding rotation of the pinion and the press ring 175 has occurred, the engagement between the serrations is reestablished, so that the press ring 175, the shaft 22 and the pinion 24 are locked again at the housing 12 by means of the locking ring 174.

In a modified embodiment, the press ring 175 may also be mounted on the shaft 22 without play, and, instead, a certain play in circumferential direction may be provided by the serrations 190, 192.

What is claimed is:
1. A seat adjuster comprising:
   a fixed part,
   a drive element,
   an output element, a clamping body coupling arrangement by which a back and forth movement of the drive element out of a neutral position and back into the neutral position is converted into a continued movement of the output element in a uniform direction of rotation, and a releasable locking device for locking the output element in a form-fitting manner on the fixed part the locking device including:

a locking ring which is axially displaceable between a locking position, in which it is non-rotatably coupled to the output element, and a release position, and cam surfaces formed on the locking ring and the drive element, which cam surfaces are complementary to one another and translate a rotation of the drive element away from the neutral position into an axial movement of the locking ring into the release position.

2. The seat adjuster according to claim wherein the clamping body coupling arrangement comprises first and second clamping body clutches connected in series and locked and released alternatingly.

3. The seat adjuster according to claim 2, wherein:

the output element is adapted to be locked at the fixed part by the first clamping body clutch, the drive element acts via the second clamping body clutch onto a release element in the first clamping body clutch, and a release element of the second clamping body clutch is biased by a return force for returning the drive element into the neutral position.

4. The seat adjuster according to claim 3, wherein the output element comprises a shaft and the drive element and the release elements of the first and second clamping body clutches are penetrated by the shaft and are each rotatable relative to the shaft with limited play.

5. The seat adjuster according to claim 4, wherein the drive element is disposed adjacent to the second clamping body clutch.

6. The seat adjuster according to claim 1, wherein the output element comprises a shaft, and the locking ring is slidable on the shaft and assumes, when in the locking position, a position in which it is keyed non-rotatably on the shaft and, when in the release position, assumes a position in which it is rotatable on a smooth portion of the shaft.

7. The seat adjuster according to claim 1, wherein:

the drive element comprises a shaft, a press ring is keyed onto the shaft, and the locking ring is elastically biased against the press ring and, when in the locking position, assumes a position in which it is in engagement with the press ring via serrations and, when in the released position, assumes a position in which the serrations release the press ring.

* * * * *